(No Model.)
H. O. BARLOW.
VEGETABLE SLICER OR GRATER.
No. 519,224.  Patented May 1, 1894.
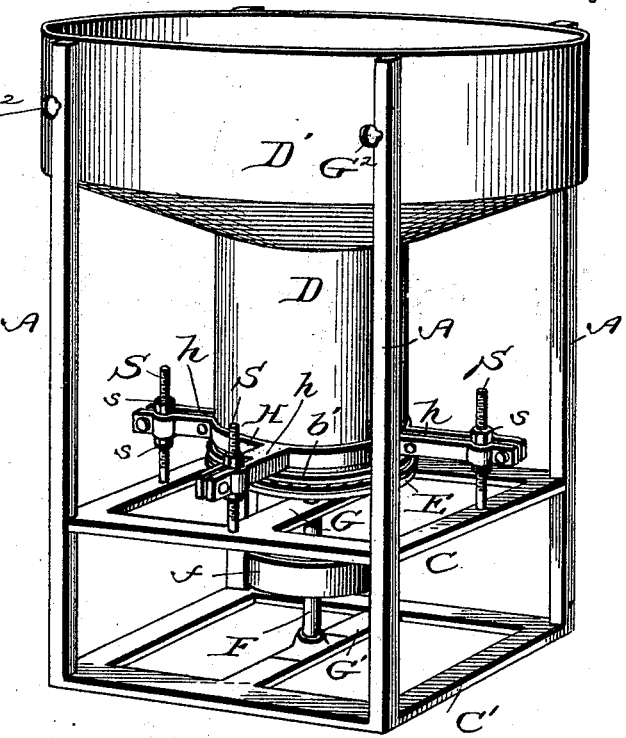
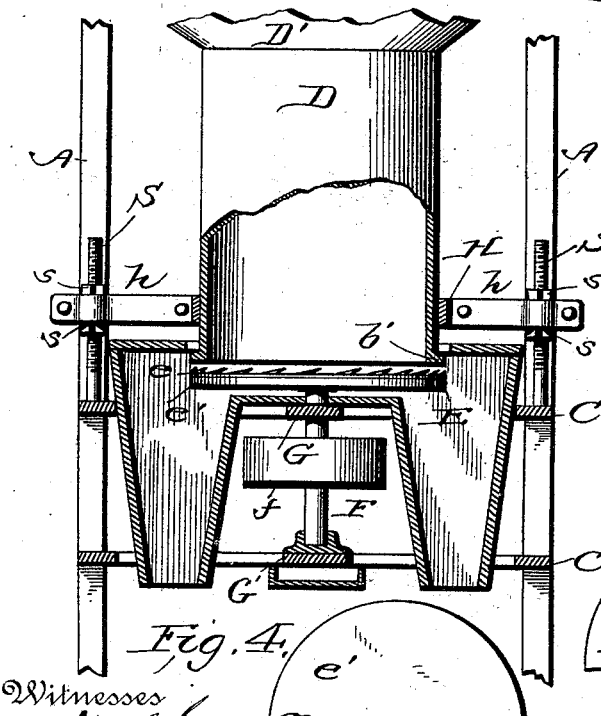
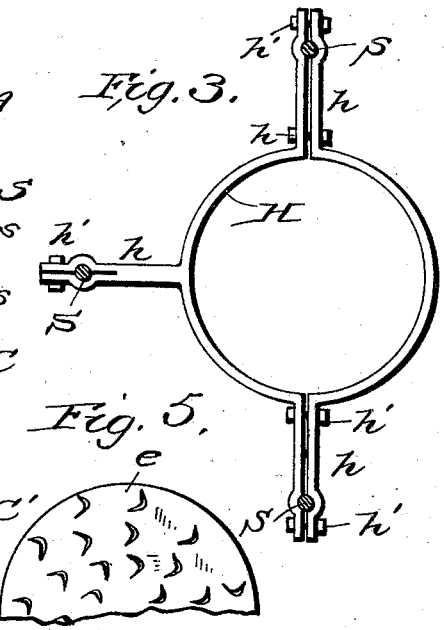
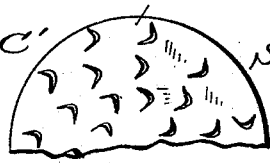
Witnesses
Inventor
Herndon O. Barlow.
By Attorneys

UNITED STATES PATENT OFFICE.

HERNDON ORLANDO BARLOW, OF DULUTH, MINNESOTA.

VEGETABLE SLICER OR GRATER.

SPECIFICATION forming part of Letters Patent No. 519,224, dated May 1, 1894.

Application filed July 7, 1893. Serial No. 479,838. (No model.)

*To all whom it may concern:*

Be it known that I, HERNDON ORLANDO BARLOW, a citizen of the United States, residing at Duluth, in the county of St. Louis, State of Minnesota, have invented certain new and useful Improvements in Vegetable Slicers or Graters; and I do hereby declare the following to be a full, clear, and exact description of the invention, such as will enable others skilled in the art to which it appertains to make and use the same.

The present invention relates to improvements in vegetable slicers and graters and is especially designed as an improvement on the Patent No. 497,009, granted me May 9, 1893. In the said patent the cutting disk is provided with an elevated rim and is vertically adjustable on the power driven shaft, the hopper being relatively fixed or stationary. By the provision of the elevated rim valuable cutting space is lost and great difficulty is experienced in adjusting the cutting disk to regulate the degree of fineness of the cuttings.

The improvement consists of the novel features and the peculiar construction and combination of the parts which will be hereinafter more fully described and claimed and which are shown in the annexed drawings, in which—

Figure 1 is a perspective view of the invention. Fig. 2 is a side elevation of the device, parts being broken away to show the relative disposition of the component elements. Fig. 3 is a top plan view of the clamp ring or band having arms which are adjustable on the threaded standards. Fig. 4 is a plan view of the cutting disk. Fig. 5 is a plan view of the plain disk forming a backing for the cutting disk.

The frame for supporting the operating parts of the machine is composed of four corner posts A, and two rectangular frames C C'. The vertical shaft F having the drive pulley *f* is journaled in cross bars G G', attached to the frames C C', respectively. The cutting disk E is fixed on the upper end of the shaft F and is flat, the cutting edges or projections extending from the center outward to as near the periphery of the disk as possible consistent with the strength. The cutting disk is preferably composed of two plates *e e'* which are riveted or otherwise secured together, the plate or disk *e'* being of iron or steel and plain, and the plate or disk *e* being of sheet steel having projections to provide the cutting edges necessary to perform the required work. The disk *e'* forms a backing for the cutting disk *e*, simply, to strengthen the same and prevent the escape of the grated or comminuted substance through the perforations in the said plate or disk *e* provided on forming the said cutting teeth, the latter being the burr or roughened edge surrounding the said openings due to piercing the plate by a sharp or other pointed instrument in the usual manner. The comminuted substance escapes through the space provided between the lower edge of the hopper and the periphery of the cutting disk. The hopper D is cylindrical in form and provided at its upper end with an enlarged portion D' which fills the space comprised between the corner posts A and is centered and steadied by means of set screws $G^2$ which pass laterally through the upper ends of the said corner posts A and bear against the sides of the said enlarged portion B. The lower end of the hopper is reinforced and strengthened by a ring *b'* of iron or other material attached thereto. This hopper is vertically adjustable to regulate the size of the discharge opening between the lower end thereof and the cutting disk E to obtain the required degree of fineness of the cuttings. It will be remembered that the cutting disk is imperforate and that the only escape for the comminuted substance is between the lower edge of the hopper and the periphery of the said cutting disk. Hence, if the substance when first cut is too large to pass through the said escape it will be retained in the hopper until reduced to the required fineness to pass through the said escape.

A clamp band H is secured to the lower portion of the hopper and is provided with arms *h* which are vertically apertured at their outer ends to receive the upper threaded ends of standards S, and which are held between pairs of nuts *s* on the upper threaded ends of the said standards. This clamp band is composed of a number of sections, each section having its end portion bent outward to form a part of the arm *h*. When the different sections are assembled and secured together by bolts $h'$ they form the clamp band and the arms $h$. The parts composing the arms $h$ have their outer end portions bent so that when the said parts are bolted together openings are provided to receive the standards S. The sections composing the clamp band are so proportioned that when bolted together they will be firmly clamped upon the hopper. When it is desired to adjust the hopper vertically the nuts $s$ are turned on the threaded portion of the standards S in the proper direction to effect the desired adjustment as will be readily understood.

The operation of the invention is precisely the same as that set forth in my prior patent. The vegetables to be sliced or grated are placed in the hopper B and the shaft F is set in motion and drives the cutting disk by means of which the required work is effected.

Having thus described my invention, what I claim, and desire to secure by Letters Patent, is—

1. In a vegetable slicer, the combination of a cutting disk mounted on a vertical shaft, a hopper, a clamp band secured to the hopper and having arms, and vertical standards having their upper ends threaded and passing through the said arms, and provided with pairs of nuts between which the said arms are held, substantially as described for the purpose set forth.

2. In a vegetable slicer, the combination of a cutting disk, a hopper, vertical standards having threaded portions and provided with pairs of nuts, a clamp band composed of sections, each section having its end portions bent outward to form arms which are held between the said pairs of nuts, and bolts for securing the said bent end portions of the sections together, substantially as set forth.

In testimony whereof I affix my signature in presence of two witnesses.

HERNDON ORLANDO BARLOW.

Witnesses:
N. H. WILSON,
JNO. P. SCOTT.